Figure 3:
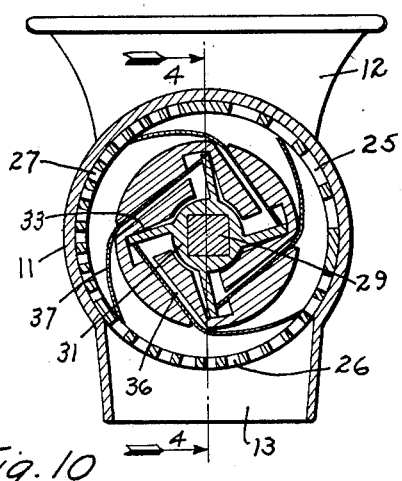

Nov. 23, 1926.
J. E. BLANKINSHIP, SR
1,608,460
MEAT CHOPPER
Filed June 4, 1925      2 Sheets-Sheet 1
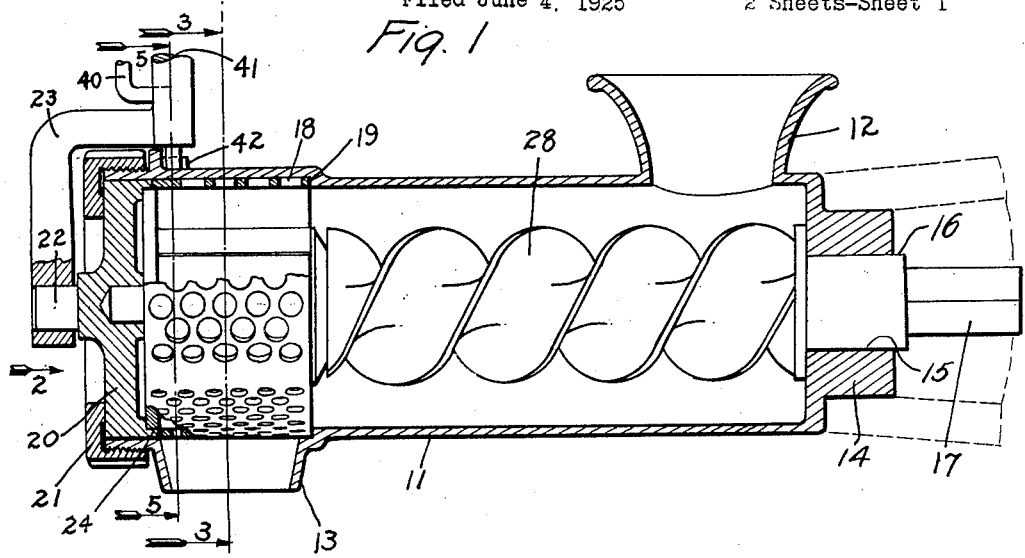
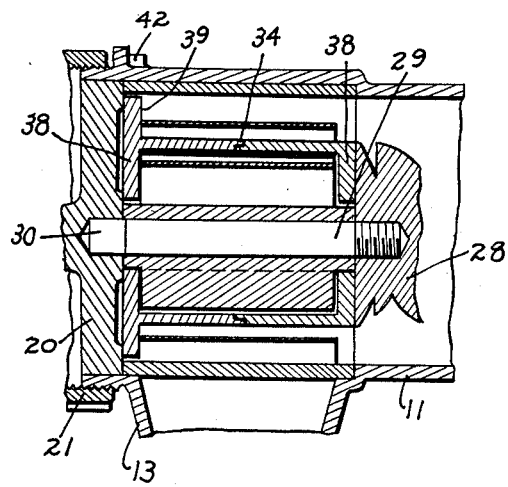
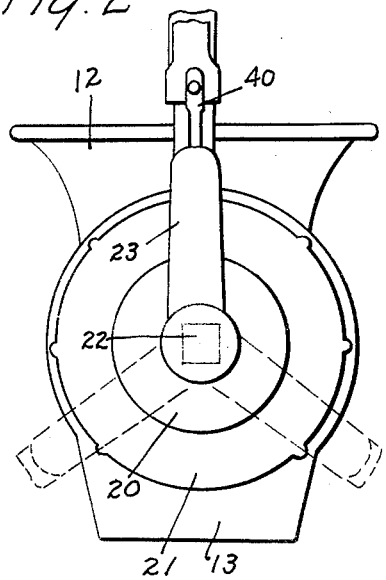
Inventor
J. E. Blankinship Sr.
by: Hazard and Miller
Attys.

Nov. 23, 1926.  1,608,460
J. E. BLANKINSHIP, SR
MEAT CHOPPER
Filed June 4, 1925   2 Sheets-Sheet 2

Inventor
J. E. Blankinship Sr.
by: Hazard and Miller
Attys.

Patented Nov. 23, 1926.

1,608,460

UNITED STATES PATENT OFFICE.

JAMES E. BLANKINSHIP, SR., OF LOS ANGELES, CALIFORNIA, ASSIGNOR TO AMERICAN SAW & KNIFE WORKS, INC., OF LOS ANGELES, CALIFORNIA, A CORPORATION OF CALIFORNIA.

MEAT CHOPPER.

Application filed June 4, 1925. Serial No. 34,800.

This invention relates to improvements in meat grinders and the like.

A leading object is to make a meat chopper or grinder having a cylindrical stationary cutter, said cutter having a plurality of perforated parts or groups, the perforations of each part being different in size from the perforations of each other part, so that each part will cut a different size of meat, there being means for mounting and moving the cutter to bring a desired part into operation and produce a chopped meat of the desired granular consistency.

Another object is to make a meat chopper or grinder having a cylindrical cutter of a plurality of parts, each part being perforated to form a different grain of meat from each other part and each part being movable into and out of operation, and there being rotating means for feeding the unground meat to and pressing it against the cutter.

Another object is to make a meat chopper or grinder having means for feeding and pressing unground meat to a cylindrical cutter, said means being adapted to automatically vary the pressure against the cutter.

Another object is to make a meat chopper having means for feeding the unground meat and pressing the unground meat against a cylindrical cutter, said means including a driving member having a central body, a plurality of tangential ribs extending outwardly from the body, a socket fitting loosely upon the body and having large recesses in which the ribs operate and slots extending from the recesses tangentially outwardly to the periphery of the socket, the socket being circular, and bent springy blades fitting slidingly in the slots against the ribs so that a variation in pressure will cause the ribs to move in the recesses and move the blades outwardly against the cutter and increase the pressure or allow the blades to move inwardly to decrease the pressure.

Another object of this invention is to provide an improved form of meat grinder, in which there is a perforated member against which blades are adapted to bear, which blades and perforated member are of an improved and novel construction.

A further object of this invention is to provide an improved meat grinder, which is capable of varying the size of the cuts, so that meat can be ground coarsely or in a fine manner without removing and replacing and substituting parts of the meat grinder to accomplish the change or variation.

Figure 5:
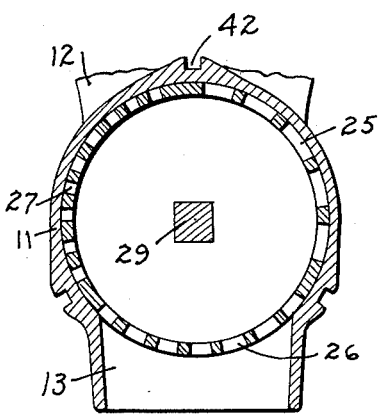
Figure 6:
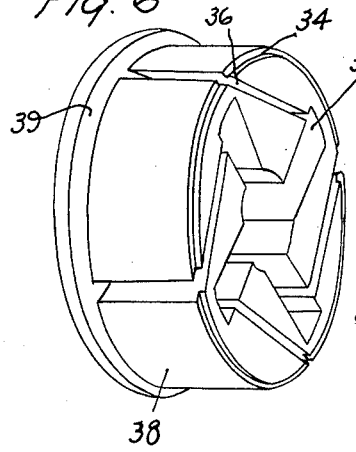
Figure 7:
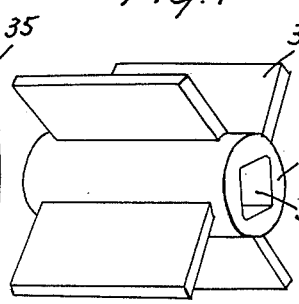
Figure 8:
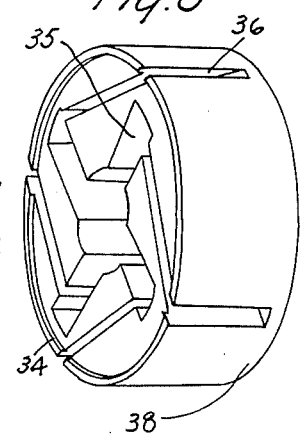

With the foregoing and other objects in view which will be made manifest in the following detailed description and specifically pointed out in the appended claims, reference is had to the accompanying drawings for an illustrative embodiment of the invention, wherein:

Figure 1 is a vertical section through the improved meat grinder,

Fig. 2 is an end elevation of the same taken in the direction of the arrow 2 upon Fig. 1, Fig. 3 is a vertical section taken upon the line 3—3 of Fig. 1, Fig. 4 is a vertical section taken upon the line 4—4 of Fig. 3, Fig. 5 is a vertical section taken upon the line 5—5 of Fig. 1, Figs. 6 and 8 are perspective views of the complementary halves forming what will hereinafter be termed a socket member, Fig. 7 is a perspective view of what will hereinafter be termed a driving member.

Figure 10:
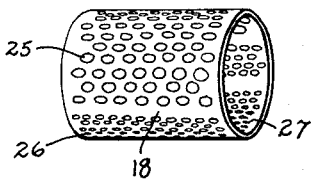
Figure 11:
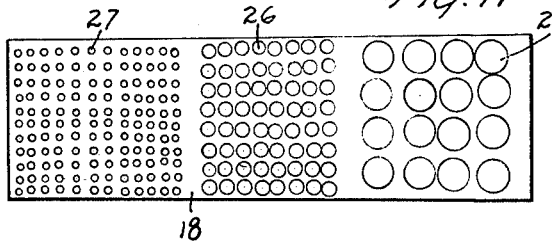
Figure 9:
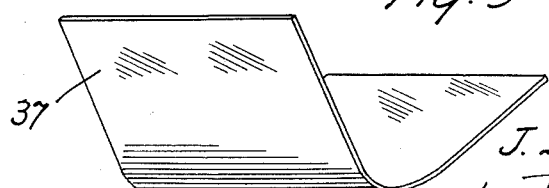

Fig. 9 is a perspective view of one of the blades employed in the improved meat grinder, Fig. 10 is a perspective view of the cylindrical, perforated member, and Fig. 11 is a development of the cylindrical, perforated member shown in Fig. 10.

Referring to the accompanying drawings wherein similar reference characters designate similar parts throughout, the improved meat grinder is shown as consisting of a hollow cylinder or container 11. An inlet spout or opening 12 is provided adjacent one end of the cylinder 11, and an outlet 13 is provided adjacent the other end of the cylinder 11. One end of the cylinder 11 is shown as being closed, as indicated at 14, provided with a bearing 15 in which is rotatable a shaft 16. The shaft 16 can be driven in any suitable manner as by a crank, motor or the like, but in the present instance it is shown as being provided with a squared end 17 to facilitate a driving connection with a motor. The opposite end of the cylinder 11 is shown as being open and the interior surface of the cylinder is slightly enlarged, as indicated at 18, to receive a cylindrical perforated cutter member 19, which has its interior surface substantially flush with the interior surface of the cylinder 11. The open end of the cylinder 11 is closable as by a cap 20, which can be fastened in position by means of a bonnet 21, which is threaded onto the end of the cylinder. The cap 20 is provided with a squared projection or hub 22, on which may be positioned a crank 23 whereby the cap can be rotated within the cylinder 11. Suitable lugs 24 are formed upon the inside face of the cap 20, which are receivable in corresponding recesses formed in the edge of the perforated cylindrical member 19, so that the cylindrical member 19 can be rotated with the cap.

The perforated cylindrical cutter member, as clearly shown in Fig. 1, is positioned over the outlet 13 and is provided with a plurality of groups of perforations of different sizes. In the present instance this cylindrical perforated cutter member is shown as provided with three groups of perforations, indicated at 25, which are of relatively large size, those indicated at 26 of medium size, and those indicated at 27 of small size. The number of groups of perforations is immaterial and may be varied depending upon the size of the perforated member 19 and upon the size of the outlet 13. By rotation of the cap 20 by the crank 23 and the consequent rotation of the cylindrical cutter member 19 with the cap, any one group of the groups 25, 26 and 27 can be positioned over the top of the outlet.

Thus I have produced a cylindrical cutter member movably mounted in a stationary cylindrical support having a downwardly discharging outlet and adapted to be moved to bring a desired part into operation over the outlet. The plural parts 25, 26 and 27 are groups of perforations extending longitudinally and arranged side by side peripherally or circumferentially.

On that portion of the shaft 16 which is disposed within the cylinder 11 there may be formed or otherwise provided a feeding screw 28, which upon rotation of the shaft 16 will force or feed meat placed in the cylinder 11 through the inlet 12 toward the end of the cylinder 11 adjacent the outlet 13. On the end of the feeding screw 28 there is provided a squared shaft 29, which may be formed integral with the feeding screw 28 or may be a separate member fastened thereto, as indicated in Fig. 4. The end of the squared shaft 29 is rounded, as at 30, and is disposed within a recess formed in the cap 20. On the squared shaft 29 there is positioned a driving member, such as is indicated in Fig. 8. This driving member has a cylindrical body or hub 31 in which is formed a squared bore 32, and a plurality of outwardly extending ribs 33 are formed on the body 31. In the present instance these ribs are arranged substantially tangent to the exterior surface of the cylindrical body 31.

About the driving member there is positioned a socket member which is formed of two complementary halves, which halves are shown in Figs. 6 and 7. Both of the halves have their exterior surfaces cylindrical in form and their adjacent edges are provided with stepped shoulders, as indicated at 34, which are adapted to interfit. These halves may be formed from dropped forgings, or may be die-cast, and have their center portions hollowed out to permit them to be received over the body 31 of the driving member. Recesses 35 are formed in each of the halves, which are of a width somewhat greater than the width of the ribs 33, so that the ribs may vibrate in the recesses as the socket turns forwardly or backwardly upon the body 31. The recesses 35 are capable of loosely receiving the ribs 33, as clearly shown in Fig. 3. Slots 36 are also formed in both of the complementary halves and these slots communicate with the outer ends of the recesses 35.

In the slots 36 there are positioned portions of blades 37. These blades as shown in Fig. 9 are preferably formed of a rectangular section of sheet metal, such as spring steel, which is bent approximately at its center upon a transverse line. One of the angular portions of the blades is disposed within a slot 36 and its end is adapted to be engaged by one of the ribs 33 upon the driving member. The other end of each blade extends from the exterior surface of the socket member and engages upon the interior surface of the perforated cylindrical cutter member 19. As clearly shown in Fig. 4, both of the halves have inwardly extending flanges 38 at their remote ends, which flanges are adapted to be engaged by the side edges of the blades 37 to prevent their axial movement upon the shaft 29. Upon the half of the socket member which is shown in Fig. 6 there is also provided an outwardly extending flange 39, which prevents the side edges of the blades from contacting with the cap 20 and cutting it. In the assembly of the cutting mechanism of the meat grinder, the half shown in Fig. 8 is first placed upon the shaft 29 and the driving member is inserted therein. The blades 37 are then placed in the slots 36 on that half, and then the half of the socket member which is shown in Fig. 6 is applied with its recesses 35 receiving portions of the ribs and its slots 36 receiving portions of the blades 37. The cap 20 can then be applied and the bonnet 21 tightened.

Thus I have produced a meat grinder having a cylindrical stationary cutter and means for feeding unground meat and yieldingly pressing the meat against the cutter, said means being adapted to automatically vary the pressure against the cutter.

The operation of the device is as follows: As the shaft 16 rotates the driving member will be caused to be rotated, so as to tend to push the blades 37 which engage upon the interior surface of the perforated member cutter 19. If the material being ground is very tough, the blades 37 will resist being moved within the cylindrical member 19, and will tend to shift the socket member backwardly about the shaft 29. The relative movement between the driving member and the socket member is such that the ribs 33 will move from the position in the recesses 35, as shown in Fig. 3, toward the opposite sides of the slots, so that the blades 37 will be relatively forced outwardly from the slots 36, causing them to bear tightly against the interior surface of the perforated member 19. If the material being cut is not so tough, the blades 37 will not resist their movement so greatly, and thus the force with which they are pressed against the interior surface of the perforated member 19 will be reduced, in this way relieving wear. In this manner it will be readily appreciated that the greatest wear between the blades 37 and the cylindrical perforated member 19 will occur when the material being ground is tough, and that when the material is not so very tough, there will be less wear. In determining whether the material shall be finely or coarsely ground, the crank 23 can be rotated from the position shown in Fig. 2 to either of the dotted line positions shown therein, and that the desired perforations will be positioned over the outlet 13 through which the ground material must pass. The cutting action of the grinder is such that the meat is forced into the perforations which are exposed by the outlet 13, and those portions which enter the perforations will be sheared off from the body of the meat by the successive movements of the blades 37. If desired, the crank 23 can be provided with a suitable pawl 40 which may be urged downwardly as by a spring 41 to engage any one of recesses 42 formed upon the exterior surface of the cylinder, so as to releasably maintain the perforated cylindrical cutter member 19 in any one of the three desired positions.

From the above it will be readily appreciated that an improved form of meat grinder is provided having a novel cutting action and cutting mechanism and which permits coarse, intermediate and fine grinding to be accomplished without requiring parts of the grinder to be removed and substituted, as in meat grinders heretofore.

It will be understood that various changes in the detail of construction may be made without departing from the spirit or scope of the invention as defined by the appended claims:

I claim:—

1. In a meat grinder, a cylinder, means providing an inlet adjacent one end and an outlet adjacent the other end of said cylinder, a perforated cylindrical member rotatably mounted in said cylinder over the outlet, said perforated cylindrical member having groups of variously sized perforations formed therein, any group of which is capable of being positioned over the outlet, means for forcing meat and the like from the inlet of the cylinder toward the outlet, and means carrying rotatable blades within said cylindrical member, said blades being adapted to engage upon the interior surface of said cylindrical member.

2. In a meat grinder, a cylinder, means providing an inlet adjacent one end and an outlet adjacent the other end of said cylinder, a perforated cylindrical member rotatably mounted in said cylinder over the outlet, said perforated cylindrical member having groups of variously sized perforations formed therein, any group of which is capable of being positioned over the outlet, a shaft rotatably mounted within said cylinder and cylindrical member, a feeding screw mounted upon said shaft adapted to feed meat from the inlet toward the outlet, and a plurality of blades carried by said shaft engageable upon the interior of said cylindrical member.

3. A meat grinder comprising a container, means providing an inlet and an outlet to said container, a perforated cylinder movably mounted upon said container, said perforated cylinder having a plurality of groups of variously sized perforations formed therein, any group of which is adapted to be positioned over said outlet, and means providing rotatable blades engageable upon said perforated cylinder.

4. A meat grinder comprising a container, means providing an inlet and an outlet to said container, a perforated cylinder movably mounted upon said container, said perforated cylinder having a plurality of groups of variously sized perforations formed therein, any group of which is adapted to be positioned over said outlet, a shaft rotatable in said container, means providing a feeding screw upon said shaft for feeding meat and the like from the inlet towards the outlet, and a plurality of resilient blades carried by said shaft engageable upon said perforated cylinder.

5. A meat grinder comprising a container, means providing an inlet and an outlet to said container, a cylindrical perforated member mounted upon said container having a portion disposed over the outlet, a feeding screw rotatable within said container for forcing meat and the like from the inlet toward the outlet, means providing a shaft upon the end of the feeding screw which is rotatable within said cylindrical perforated member, a driving member having outwardly extending ribs formed thereon mounted against rotation upon said shaft, a socket member disposed about said driving member having recesses formed therein capable of loosely receiving said ribs, there being slots formed in said socket member communicating with the recesses, and blades disposed within said slots, one end of each blade engaging a respective rib upon said driving member, the other end of each blade engaging upon the interior of said cylindrical perforated member.

6. A meat grinder comprising a container, means providing an inlet and an outlet to said container, a cylindrical perforated member mounted upon said container having a portion disposed over the outlet, a feeding screw rotatable within said container for forcing meat and the like from the inlet toward the outlet, means providing a shaft upon the end of the feeding screw which is rotatable within said cylindrical perforated member, a driving member having outwardly extending ribs formed thereon mounted against rotation upon said shaft, a socket member disposed about said driving member having recesses formed therein capable of loosely receiving said ribs, there being slots formed in said socket member communicating with the recesses, and angular blades disposed within said slots, one end of each blade engaging a respective rib upon said driving member, the other end of each blade engaging upon the interior of said cylindrical perforated member.

7. In a meat grinder, a perforated cylindrical member, a shaft rotatable therein, a driving member having outwardly extending ribs mounted against rotation upon the shaft, a socket member disposed about said driving member having recesses adapted to loosely receive said ribs, there being slots formed in said socket member communicating with said recesses, and blades disposed within said slots engageable with the ribs upon said driving member and upon the interior surface of said cylindrical member.

8. In a meat grinder of the class described, a perforated cylindrical member, a shaft rotatable therein, a driving member mounted against rotation upon said shaft, said driving member having a plurality of outwardly extending ribs formed thereon, a socket member formed of two complementary halves disposed about said driving member, there being recesses formed in said socket member adapted to loosely receive said ribs, there being slots formed in said socket member communicating with said recesses, and blades disposed within said slots, each blade having one end engageable by a respective rib upon the driving member, and the other end engageable upon the interior surface of said perforated cylindrical member.

9. In a meat grinder of the class described, a perforated cylindrical member, a shaft rotatable therein, a driving member mounted against rotation upon said shaft, said driving member having a plurality of outwardly extending ribs formed thereon, a socket member formed of two complementary halves disposed about said driving member, there being recesses formed in said socket member adapted to loosely receive said ribs, there being slots formed in said socket member communicating with said recesses, and blades disposed within said slots, each blade having one end engageable by a respective rib upon the driving member, and the other end engageable upon the interior surface of said perforated cylindrical member, the remote ends of the halves forming said socket member being provided with inwardly extending flanges engageable by the side edges of said blades.

10. In a meat grinder, a stationary cylindrical container having an outlet in its periphery, a cylindrical cutter member having apertures of different sizes mounted in the cylinder and movable to bring a desired part into registration with the outlet.

11. A meat grinder having a cylindrical perforated cutter having apertures of varying sizes, each part adapted for cutting grains of meat of a different size from each other part, and the cutter being movable to bring a desired part into operation.

12. A meat grinder having a cylindrical cutter with apertures of varying sizes extending longitudinally and side by side peripherally or circumferentially, and means for mounting the cutter to be moved upon its axis to bring a desired part into operation.

13. A meat grinder having a cylindrical perforated cutter, means for feeding unground meat to the cutter, springy blades for pressing the meat against the cutter, and automatic means for varying the pressure of the blades against the cutter.

14. A meat grinder having means for feeding unground meat and pressing the unground meat against a cylindrical cutter, said means including a driving member having a central body adapted to be rotatably mounted and a plurality of tangential ribs extending outwardly from the body, a socket fitting loosely upon the body and having large recesses in which the ribs operate and vibrate and having slots extending from the recess tangentially outwardly to the periphery of the socket, the socket being circular and bent, springy blades fitting slidingly in the slots against the ribs so that a variation in the pressure will cause the ribs to vibrate in the recesses and move the blades outwardly against the cutter and increase the pressure or allow the blades to move inwardly to decrease the pressure.

In testimony whereof I have signed my name to this specification.

J. E. BLANKINSHIP, Sr.